United States Patent
García Maestre et al.

(10) Patent No.: US 9,359,993 B2
(45) Date of Patent: *Jun. 7, 2016

(54) WIND TURBINE ASSEMBLING METHOD AND WIND TURBINE ASSEMBLED ACCORDING TO SAID METHOD

(75) Inventors: Iván García Maestre, Sarriguren (ES); Asier Gómez Andueza, Sarriguren (ES); Eduardo Azanza Ladrón, Sarriguren (ES); Ander Gastón Lujambio, Sarriguren (ES); José Miguel García Sayés, Sarriguren (ES); Miguel Nuñez Polo, Sarriguren (ES)

(73) Assignee: ACCIONA WINDPOWER, S.A. (ES)

( * ) Notice: Subject to any disclaimer, the term of this patent is extended or adjusted under 35 U.S.C. 154(b) by 978 days.

This patent is subject to a terminal disclaimer.

(21) Appl. No.: 13/537,569

(22) Filed: Jun. 29, 2012

(65) Prior Publication Data

US 2013/0001954 A1    Jan. 3, 2013

(30) Foreign Application Priority Data

Jun. 30, 2011 (ES) .................................. 201131110

(51) Int. Cl.
*F03D 11/04* (2006.01)
*F03D 1/00* (2006.01)
(Continued)

(52) U.S. Cl.
CPC ................ *F03D 1/001* (2013.01); *F03D 11/04* (2013.01); *E04C 5/02* (2013.01); *E04C 5/03* (2013.01); *E04C 5/07* (2013.01); *E04C 5/12* (2013.01); *E04C 5/125* (2013.01); *E04C 5/163* (2013.01); *E04C 5/18* (2013.01); *E04C 5/20* (2013.01);
(Continued)

(58) Field of Classification Search
CPC ..... F03D 11/04; F03D 11/045; Y02E 10/728; F05B 2260/301; F05B 2240/912; E04H 12/12; E04H 12/16; E04H 12/085; E04C 5/02; E04C 5/03; E04C 5/07; E04C 5/12; E04C 5/163; E04C 5/20; E04C 5/18; E04C 5/125
USPC ............ 415/213.1; 416/244 R, 244 A, 245 R, 416/DIG. 6; 52/223.5, 848, 849, 745.03, 52/745.17, 745.18, 745.2
See application file for complete search history.

(56) References Cited

U.S. PATENT DOCUMENTS 1,206,484 A * 11/1916 Swan ........................ E04H 7/20
52/223.3
2008/0040983 A1* 2/2008 Fernandez Gomez .. E04H 12/12
52/40

(Continued)

FOREIGN PATENT DOCUMENTS

| DE | 19936603 A1 | 2/2001 |
|----|----|----|
| EP | 1889988 A2 | 2/2008 |
| WO | WO 2010/049313 A2 | 5/2010 |

*Primary Examiner* — Christopher Verdier
(74) *Attorney, Agent, or Firm* — Ostrolenk Faber LLP

(57) ABSTRACT

A wind turbine tower that may be assembled fast, including a nacelle and a rotor, the tower comprising at least two stackable annular sections made of concrete connected through a main connecting arrangement adapted to withstand loads induced by the wind turbine rotor, and an auxiliary connector.

6 Claims, 7 Drawing Sheets

(51) Int. Cl.
*E04C 5/07* (2006.01)
*E04H 12/12* (2006.01)
*E04C 5/02* (2006.01)
*E04C 5/03* (2006.01)
*E04C 5/12* (2006.01)
*E04H 12/08* (2006.01)
*E04H 12/16* (2006.01)
*E04C 5/16* (2006.01)
*E04C 5/18* (2006.01)
*E04C 5/20* (2006.01)

(52) U.S. Cl.
CPC ............... *E04H 12/085* (2013.01); *E04H 12/12* (2013.01); *E04H 12/16* (2013.01); *F05B 2230/61* (2013.01); *F05B 2240/912* (2013.01); *F05B 2260/301* (2013.01); *Y02E 10/726* (2013.01); *Y02E 10/728* (2013.01); *Y02P 70/523* (2015.11); *Y10T 29/49826* (2015.01)

(56) References Cited

U.S. PATENT DOCUMENTS

| | | | |
|---|---|---|---|
| 2009/0000227 A1* | 1/2009 | Jakubowski | E04H 12/085 52/223.4 |
| 2010/0290918 A1 | 11/2010 | Pedersen | 416/245 |
| 2012/0047840 A1* | 3/2012 | Gregor | E04H 12/04 52/651.01 |
| 2014/0044554 A1* | 2/2014 | Lafferty | E02D 27/42 416/244 R |
| 2014/0175038 A1* | 6/2014 | Arlaban Gabeiras | E04H 12/00 212/195 |

* cited by examiner

WIND TURBINE ASSEMBLING METHOD AND WIND TURBINE ASSEMBLED ACCORDING TO SAID METHOD

OBJECT OF THE INVENTION

The object of the invention is a wind turbine assembling method, said wind turbine comprising a tower, a nacelle and a rotor which, by using suitable means, achieves an increase in the speed of the assembling of a wind turbine and thus in that of a wind farm consisting of several wind turbines. Another object of the present invention is the wind turbine assembled according to the above method.

BACKGROUND OF THE INVENTION

The wind turbines comprise a tower, a nacelle which houses the electrical generator and a rotor formed in turn by at least two blades. The tower of the wind turbine supports the nacelle and the rotor. Large wind turbines have steel, lattice, or reinforced concrete towers or even mixed-type towers, the latter comprising sections of different materials, for example, a lower section of concrete and an upper section of steel or lattice.

The larger the diameter of the rotor, the higher the rated power of the wind turbines which in turn involves the use of higher towers. The increase in tower height may necessarily require that the tower be divided into several annular sections which are stacked during the wind turbine assembly stage thus forming the full height of the tower. Dividing the tower into sections has the advantage that each section has a size such that its transport by road or rail is easier.

One of the most commonly used materials for large towers is concrete, since it involves acceptable production costs compared to those for the production of steel towers of similar characteristics. However, the weight of each concrete tower section can easily exceed one hundred tons, this fact being infrequent for metal tower sections, so stacking the concrete sections requires heavy-tonnage lifting and positioning means. The cost of using such lifting and positioning means, which may be for example a crane, is directly related to the tonnage that it is capable of handling and the time of use thereof. This high-tonnage crane is also used for lifting and positioning the nacelle, as the weight of the nacelle may also exceed 100 tons.

The design of wind turbine components and the design of the connections between them once placed, should take into account the loads they will be subjected to throughout their useful life to ensure the proper functioning thereof. In particular, the connections between different sections comprising concrete are adapted to withstand the loads induced by the rotor, these being the loads resulting from the wind falling on the surface of the rotor and the rotor weight loads.

It is known in the prior art that the procedure for assembling a wind turbine comprises the following stages:
  Stacking each upper annular section onto the lower annular section by using lifting and positioning means;
  Performing the connection between both upper and lower annular sections, connection meaning that which is adapted to withstand loads induced by the rotor;
  Repeating the above steps for all the sections of the tower;
  Stacking the nacelle onto the upper annular section;
  Performing the connection between the nacelle and the upper section, the connection being adapted to withstand loads induced by the rotor.

This method for the assembly of wind turbines has the disadvantage that the use of the crane involves a lot of time since the connecting of sections takes a long time, i.e. the hardening of the binding material takes time, and meanwhile the crane is inactive.

DESCRIPTION OF THE INVENTION

The method object of the invention is implemented in a wind turbine comprising a tower, a nacelle and a rotor. The tower is of the type comprising stackable annular sections, at least two of these annular sections being made of concrete. The assembly procedure is of the type comprising the following steps:
  Stacking the annular sections by using lifting and positioning means;
  Stacking the nacelle onto the upper annular section;
  Main connection of the annular sections between each other, and between the upper annular section and the nacelle through main connecting means adapted to withstand loads induced by the wind turbine rotor.

The method object of the invention is characterized in that the main connection of the concrete annular sections between each other by main connecting means is performed after stacking the nacelle onto the upper annular section.

Therefore, unlike the method known in the prior art, there is a first phase in which the stacking of all the annular sections and the nacelle is performed and subsequently the main connections between the annular sections made of concrete are carried out. Thus, the technical effect of increasing the speed of assembling a wind turbine is achieved, which results in reducing the time of use and therefore the cost of using a crane during the assembly of the wind turbine, since during the latter phase of performing the main connections the use of a high-tonnage crane is not required.

Before assembling the wind rotor on the tower and nacelle assembly, the main connections are carried out, since once the wind rotor is placed the wind turbine is subjected to loads induced by the rotor, i.e. as a result of wind falling on the surface of the rotor and due to the weight of the rotor itself. The wind turbine design stage comprises a phase involving the calculation of both extreme and fatigue dimensioning loads, to verify the proper sizing of each of the components and their respective connections. Such dimensioning loads are laid down in regulations and always include the complete wind turbine, including the rotor, because once the rotor is placed, the loads can be major although the turbine is not yet connected to the grid. Without the implementation of these main connections the wind turbine could be irreversibly damaged when the rotor is placed. Once the main connections have been carried out, a low-tonnage crane places the rotor on the nacelle.

Therefore, main connection refers to that carried out to withstand the loads of the wind turbine induced by the rotor, both due to the impact of wind and due to the rotor's own weight. Examples of main connections may include the following among others:
  Threaded connections, in which the torque should be greater than one specified and must be performed in each and every connection forming the wind turbine;
  Wet or dry connections in which the type of adhesive means (mortar, grout, etc.), and curing or drying time thereof applied to each of the connections must meet certain specifications.

The proposed assembly procedure can be applied both to concrete towers and mixed-type towers. Mixed-type towers comprise at least one concrete part, usually at the lower part, and an upper metal or lattice part.

Another object of this invention is a wind turbine comprising a tower, a nacelle and a rotor, said tower comprising stacked annular sections having at least two of them made of concrete, and main connecting means for connecting the sections to each other and for connecting the upper section to the nacelle, said main connection means being adapted to withstand loads induced by the wind turbine rotor. The wind turbine is characterized in that it further comprises auxiliary connecting means for connecting the annular sections made of concrete to each other, said auxiliary connecting means being adapted to withstand assembly loads and loads induced by wind on the wind turbine in absence of the rotor, but not loads induced by the rotor.

Another object of this invention is the assembly method for the assembling of a plurality of wind turbines in a wind farm, wherein each wind turbine comprises stackable annular sections of which at least two annular sections are made of concrete. For each wind turbine the method comprises performance of the following:

A first assembly phase which comprises:
Stacking the annular sections by using lifting and positioning means;
Stabilizing each annular section made of concrete using auxiliary connecting means adapted to withstand assembly loads and loads induced by the wind on the wind turbine in absence of the rotor, but not loads induced by the rotor.
Stacking the nacelle on the upper annular section by using lifting and positioning means;
A second assembly phase subsequent to the first assembly phase which comprises carrying out main connections of the concrete annular sections to each other via main connecting means adapted to withstand loads induced by the wind turbine rotor, wherein the first assembly phase and the second assembly phase can be performed simultaneously on at least two turbines of a wind farm.

DESCRIPTION OF THE FIGURES

To complement the description being made and for the sake of a better understanding of the characteristics of the invention according to a preferred practical embodiment thereof, attached as an integral part of said description are a set of drawings wherein, for the purpose of illustration and not limiting the scope of the invention, the following is shown.

PREFERRED EMBODIMENT OF THE INVENTION

Figure 1:
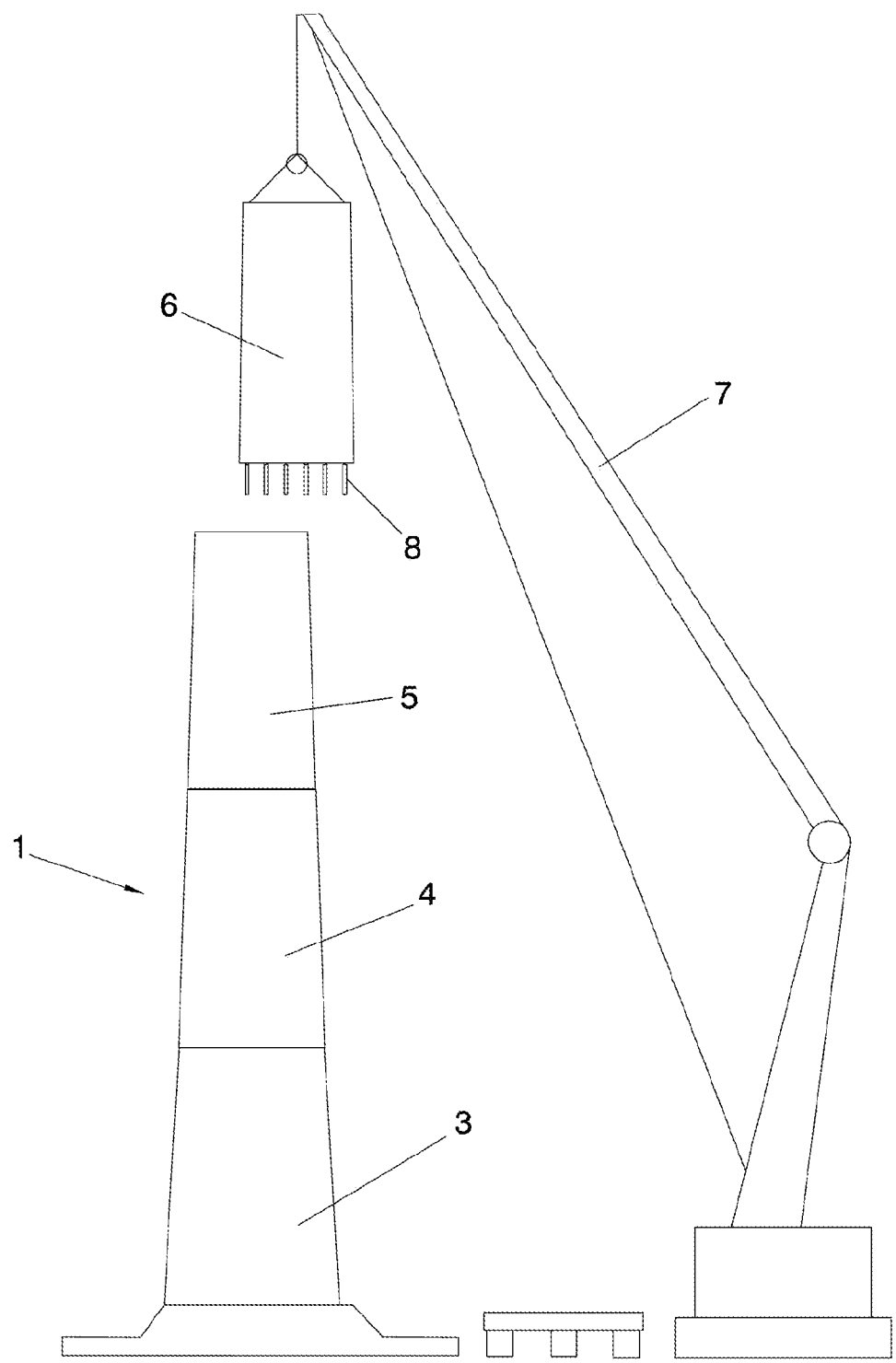
FIG. 1.—Shows a schematic view of a tower comprising four sections and a crane for stacking the upper section onto the lower sections.
Figure 2:
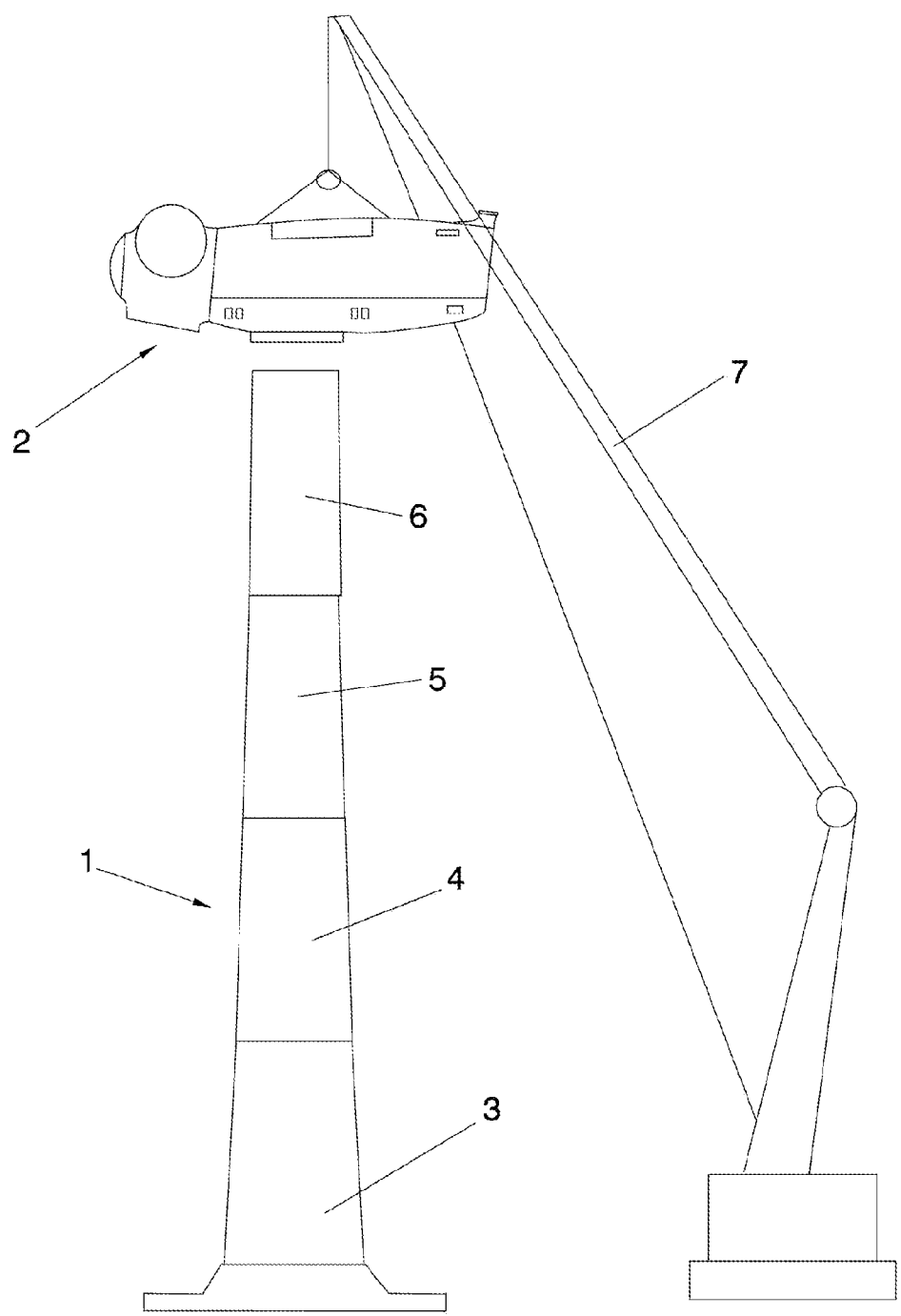
FIG. 2.—Shows a schematic view of a tower comprising four stacked sections and a crane for stacking the nacelle onto the upper section.

FIG. 1 shows part of the assembling procedure of the invention. By means of a crane (7) the lifting and positioning of the four annular sections (3, 4, 5, 6) into which a tower (1) is divided is performed. FIG. 2 represents another step of the procedure object of the invention wherein a nacelle (2) is lifted and positioned onto an upper section (6). In the embodiment shown in FIGS. 1 and 2 the entire tower (1) is formed by annular sections (3, 4, 5, 6) made of concrete, but it may also be formed by at least two annular sections (3, 4, 5, 6) made of concrete and the remaining annular sections being made of metal for instance.

Figure 3:
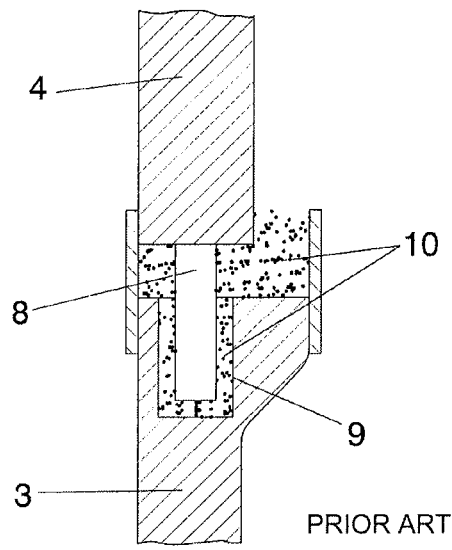
FIG. 3.—Shows a schematic view of a section along a vertical plane of two adjacent sections which shows an embodiment of a main connection of sections to each other.

FIG. 3 shows an embodiment of the main connections known in the prior art. Usually the annular sections (3, 4, 5, 6) made of concrete comprise bars (8) that emanate at least from a lower base of the annular sections (3, 4, 5, 6), and housings (9) located in an upper base of the annular sections (3, 4, 5, 6), thus the bars (8) may be inserted into the housings (9) of a lower annular section (3, 4, 5, 6).

In performing a main connection for connecting the annular sections (3, 4, 5, 6) made of concrete to each other, it is common to use mortar or grout (10), which is injected both into an horizontal joint between the surfaces of two adjacent annular sections (3, 4, 5, 6) and in the space between the bars (8) and housings (9). This ensures that the bars (8) withstand bending stress once the rotor has been placed on the nacelle (2) in the case of lateral loads caused by the pushing effect of wind on the rotor, both when the wind turbine is in operation or when stopped for overhaul work prior to connecting the turbine to the mains or for maintenance work. The total time required for carrying out said main connections is that required to perform the mortar or grout (10) injection, plus the time required for the mortar or grout (10) to harden in each of the main connections. Therefore, the total execution time of main connections amounts to over 24 hours in general, often being over 48 or even 72 hours.

Typically the centre of gravity of the nacelle (2) is offset from the axis of the tower (1). The offset frequently involves advancement of the nacelle in the direction of the hub with respect to the axis of the tower (1) due to the presence of very heavy components in the front part of the nacelle (2) in relation to the rear part, such as the hub itself, an low-speed shaft or bearings.

To withstand the offset of the centre of gravity of the nacelle (2) and the presence of lateral loads due to the effect of wind on the surface of the tower (1) and the nacelle (2) during the assembling stage, the procedure comprises a stage for the stabilizing of each of the annular sections (3, 4, 5, 6) made of concrete, for example of the second annular section (4) on the first annular section (3), before placing the nacelle (2). This stabilization step is performed using auxiliary connection means adapted to withstand assembly loads and loads induced by the wind on the wind turbine in absence of the rotor, but not loads induced by the rotor.

These auxiliary connections must be capable of transmitting the abovementioned loads to the base of the tower (1), withstanding not only compression stress but also bending, tensile and shear stress and enabling loads to be withstood during the assembly and loads induced by the wind by the pushing effect on the tower and the nacelle and the offset centre of gravity of the nacelle with respect to the axis of the tower.

The method for performing the auxiliary connections between annular sections (3, 4, 5, 6) of the tower (1) when the sections are made of concrete is far less costly time-wise than the performance of the main connections between said annular sections (3, 4, 5, 6) since such connections withstand a lower load. Thus, the operating time of the high-tonnage crane can be reduced.

The stabilization of annular sections (3, 4, 5, 6) of the tower (1) when the sections are not made of concrete or the stabilization of the nacelle (2) can be performed using the very same main connection means, e.g. threaded connections, but having a smaller torque than that specified for the wind turbine having a rotor in place. Alternatively, auxiliary means may also be used for the stabilizing of such elements, provided it saves time in the completion of the first assembly stage of the wind turbine.

Once these components have been joined using main or auxiliary connections, as appropriate, the tower (1) and nacelle (2) assembly withstands for at least several weeks the loads associated with the wind and the nacelle (2) weight runout with respect the axis of the tower (1).

Once the rotor has been placed, the assembly will withstand loads induced by said rotor due to the wind load on the surface of the blades and the rotor's own weight. Therefore, the rotor is placed after performing all main connections of annular sections (3, 4, 5, 6) to each other and main connections of the tower (1) and the nacelle (2) to the hub.

Figure 4:
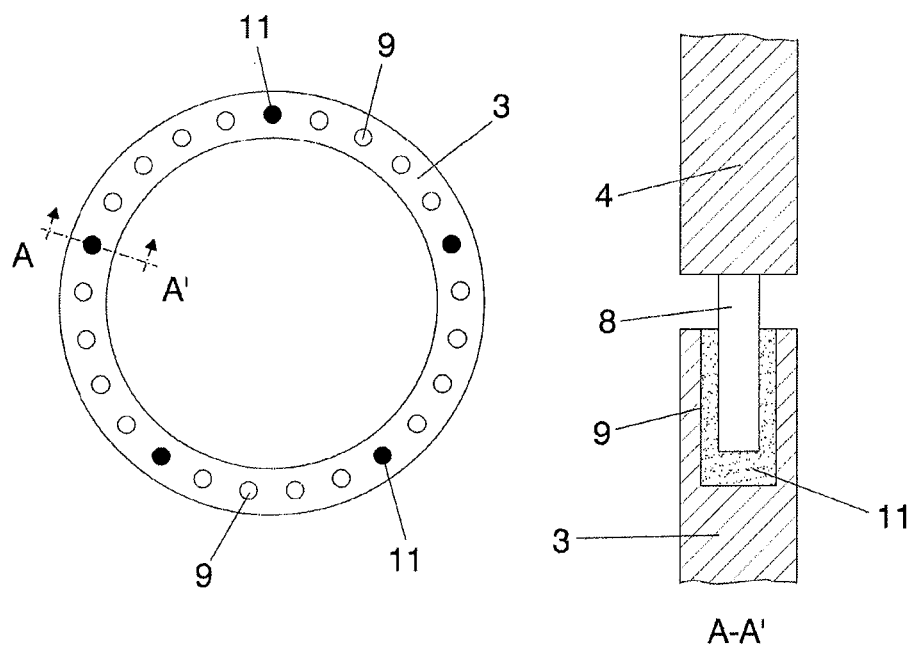
FIG. 4.—Shows a schematic view of a section along a vertical plane of two adjacent sections and a plan view of the lower section which shows a first embodiment of auxiliary connections of sections to each other.

The intermediate phase of stabilization using auxiliary connecting means prior to placement of the nacelle has different embodiments that are described hereunder:

FIG. 4 shows an embodiment in which performing the auxiliary connections comprise the step of adding resin (11) in some gaps between the bars (8) and housings (9) of the tower sections (1) made of concrete in the assembly position. This ensures that the bars (8) withstand bending stress during the assembly of the wind turbine in the case of lateral loads due to the effect of wind load on the wind turbine. Said resins (11) are fast curing, taking less than 24 hours to cure, preferably less than 12 h. Once the resin (11) has cured in each of the auxiliary connections of the tower (1), the lifting and placement of the nacelle (2) on the upper section (6) of the tower (1) is then performed.

Auxiliary connections having resin (11) allow the tower (1) and nacelle (2) assembly to withstand during a period of several weeks loads associated to the wind and to the offset weight of the nacelle (2) with respect to tower (1) axis.

The number of connections between bar (8)—housing (9) assemblies in which these resins are used (11) for the implementation of auxiliary connections is less than the total number of bar (8)—housing (9) assemblies of each annular section (3, 4, 5, 6) made of concrete. In a preferred embodiment, see FIG. 4, the number of connections between bars (8) and housings (9) in which said resins are used is less than 20%. In addition the resin (11) is inserted in non-contiguous connections which are uniformly distributed along the perimeter of the circle in which they are inscribed, thus the assembly loads are transmitted evenly from one annular section (3, 4, 5, 6) to another (3, 4, 5, 6) both made of concrete.

The combination of a number of auxiliary connections being less than the main connections, together with a shorter execution and curing time of said auxiliary connections enables the entire process to be performed continuously with a single crane (7) and thus reduce the operating time of the high-tonnage crane (7) for the assembly of the wind turbine. Said crane (7) can be used from that time to assemble another wind turbine in the wind farm.

Figure 5:
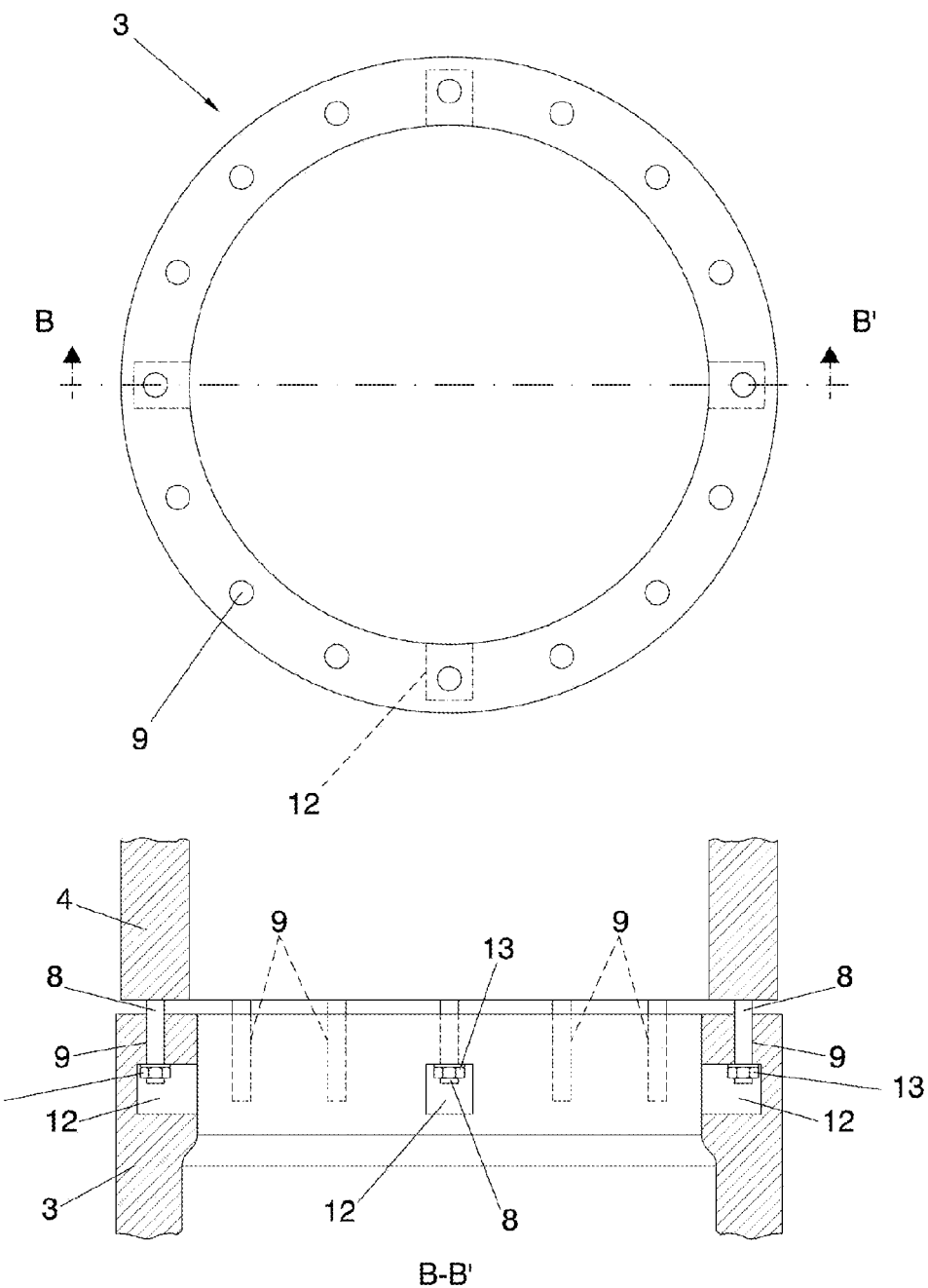
FIG. 5.—Shows a schematic view of a section along a vertical plane of two adjacent sections and a plan view of the lower section which shows a second embodiment of auxiliary connections of sections to each other.

FIG. 5 shows a second embodiment of the stabilization phase using auxiliary connections prior to placement of the nacelle.

For this purpose the annular sections (3, 4, 5, 6) made of concrete comprise a recess (12) open towards the interior of the section (3, 4, 5, 6) and located at the lower part of some of the housings (9) so that the stage of stabilization comprises access to the bars (8) of an upper annular section (3, 4, 5, 6) through the recesses (12) of the lower annular section (3, 4, 5, 6) and the tightening of a retaining element (13) on the bar (8).

Figure 6:
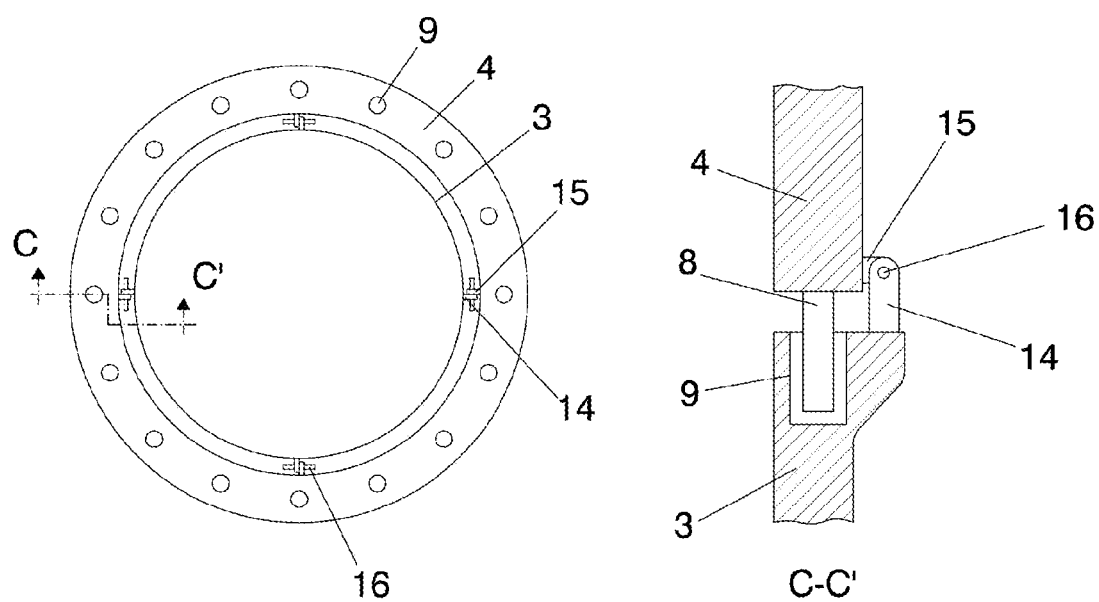
FIG. 6.—Shows a schematic view of a section along a vertical plane of two adjacent sections and a plan view of the lower section which shows a third embodiment of auxiliary connections of sections to each other.

FIG. 6 shows a third embodiment of the auxiliary connections wherein lugs (14, 15) and threaded bolts (16) are used.

For this, the annular sections (3, 4, 5, 6) made of concrete comprise some first lugs (14) adjacent to the upper base and some second lugs (15) joined to the first lugs (14) and adjacent to the lower base, so that the stage of stabilization comprises interposing connecting dowel rods (16) for connecting some first lugs (14) and some second lugs (15) and the blocking of said connecting dowel rods (16).

Said lugs (14, 15) can be positioned and fixed to the walls of the annular sections (3, 4, 5, 6) in a factory at the time of manufacture thereof, or alternatively performed on site when assembling the wind turbine. Preferably, and for each connection, one of the lugs (14) is factory-fixed to one of the sections (3) and another is fixed to the adjacent section (4) when assembling the tower (1), allowing adjustment of the position to ensure contact of the planes of the lugs (14, 15). Thus the problems of tolerances in components of large dimensions are overcome.

In the same manner as in the first embodiment of the stage of stabilization, the second example and the third example require a small number of auxiliary connections which are uniformly distributed along the perimeter of the circle in which they are inscribed, so the assembly loads are transmitted evenly from one annular section (3, 4, 5, 6) made of concrete to another annular section (3, 4, 5, 6) made of concrete.

Figure 7:
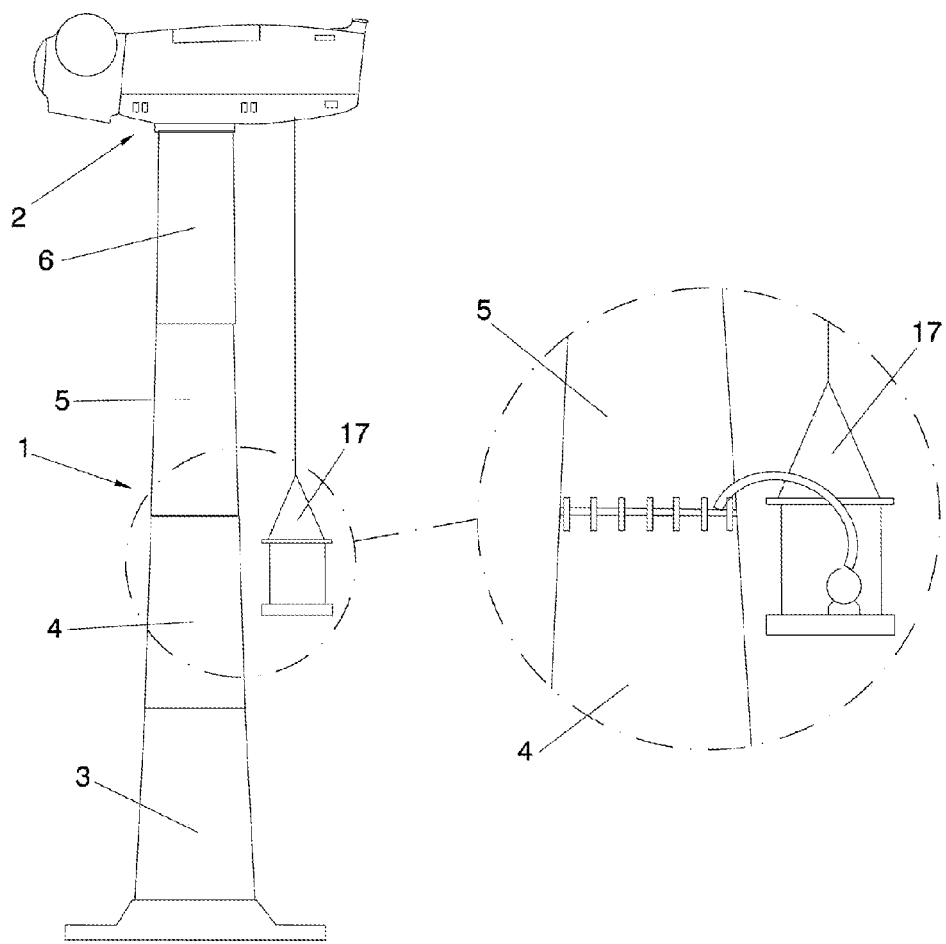
FIG. 7.—Shows a schematic view of an embodiment of the main connections of sections to each other.

FIG. 7 shows an embodiment for accessing the connections connecting the annular sections (3, 4, 5, 6) made of concrete of the tower (1) to each other and for the performance of the main connections connecting the annular sections (3, 4, 5, 6) to each other, wherein lifting means are used which comprise a hanging platform (17) suspended from the nacelle (2) or from the upper section (6) of the tower (1), thus avoiding the use of large cranes (7) or intermediate platforms.

Where the hanging platform (17) is suspended from the nacelle (2), and since the nacelle (2) is normally attached to the tower (1) via a bearing and a yaw mechanism, said yaw mechanism can be actuated in order to access the joints between annular sections (3, 4, 5, 6) along the entire perimeter of the annular sections for the execution of the main connections.

The annular sections (3, 4, 5, 6) may be formed from the connection of different segments or prefabricated voussoirs, i.e., the sections may be vertically divided into several segments which are assembled one beside another on an assembly platform located in the wind farm.

Figure 8:
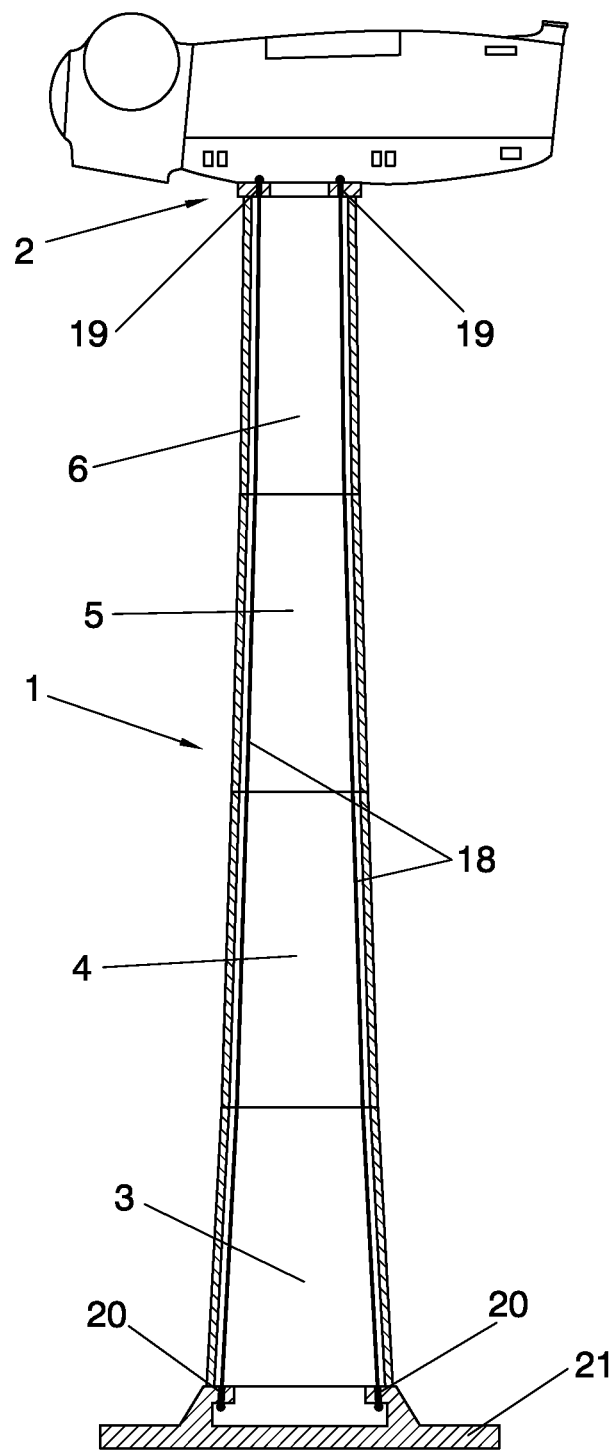
FIG. 8.—Shows a schematic view of a section along a vertical plane of a wind turbine having a tower comprising four stacked sections, a nacelle onto the upper section of the tower and tensioning cables running along the tower between the tower foundation and the upper base of the concrete part of the tower.

FIG. 8 shows a fourth embodiment of the stabilization phase using auxiliary connections wherein tensioning cables (18) are used.

The auxiliary connection means comprises tensioning cables (18) having an upper end (19) and a lower end (20).

The upper end (19) is connected to the tower (1), preferably to the upper annular section (6) of the part of the tower (1) made of concrete. The lower end (20) is connected in such a way that the tensioning cables (18) are tensioned in such way so as to provoke compression stress on the tower (1). If all the annular sections (3, 4, 5, 6), are made of concrete, the whole tower (1) is subject to compression stress. If, otherwise, only some of the annular sections (3, 4, 5, 6) are made of concrete, the tensioning cables (18) are tensioned in such a way so as to provoke compression stress on the part of the tower (1) made of concrete.

For example, the lower end (20) may be directly connected to the tower (1) at a lower position than that of the upper end (19). In a more particular way, the lower end (20) may be fixed to a foundation (21) upon which the tower (1) rests, as shown in FIG. 8. The level of tension applied to the tensioning cables (18) is such that the state of loads born by the tower (1) comprises a higher proportion of compression loads than in absence of the tensioning cables (18). Therefore, the bending stresses provoked in the tower (1) as a consequence of the wind blowing on the wind turbine are at least partially born by the tensioning cables (18). This ensures that the tower (1) is able to withstand bending stress during the assembly of the wind turbine associated to lateral loads due to the effect of wind load on the wind turbine and to the offset weight of the nacelle (2) with respect to tower (1) axis when the rotor is not mounted yet.

At least some of the tensioning cables (18) are mounted before the nacelle, whilst some of said tensioning cables may be mounted after the nacelle.

Additionally, a first tension of the tensioning cables (18) before mounting the nacelle may be different from a second tension of the tensioning cables (18) after having mounted the nacelle.

In a preferred embodiment, the first tension applied to the tensioning cables (18) is substantially lower than the second tension finally applied to the tensioning cables (18) to withstand the loads induced by the rotor.

In a preferred embodiment, the number of tensioning cables (18) for the implementation of auxiliary connections before the mounting of the nacelle is less than the total number of tensioning cables (18) used for the final assembly of the wind turbine, after having mounted the nacelle. In a more preferred embodiment, the number of tensioning cables (18) in the stabilization phase is at least three and they are tensioned at a tension that is less than the 50% of the tension finally applied to the cables to withstand the loads induced by the rotor.

In an embodiment, the tensioning cables (18) used as auxiliary connections are uniformly distributed along the perimeter of a circle in which they are inscribed, thus the assembly loads are transmitted evenly from one annular section (3, 4, 5, 6) to another (3, 4, 5, 6) both made of concrete.

In a preferred embodiment, the tensioning cables (18) run along the tower (1) between the tower foundation and the upper base of the upper section (6) of the tower, which is made of concrete.

In a preferred embodiment, the maximum wind speed that the wind turbine can withstand during the assembly phase, when the rotor is not mounted yet, without main nor auxiliary connections is calculated. Then the auxiliary connections described above are only performed if the weather forecast foresees the possibility of overcoming this maximum wind speed.

The invention claimed is:

1. A wind turbine, comprising:
   a nacelle;
   a rotor, and
   a tower comprising stackable annular sections comprising:
      at least two annular sections made of concrete, and
      main connectors positioned and configured to connect the sections to each other and to connect the upper section to the nacelle, the main connectors being adapted to withstand loads induced by the wind turbine rotor,
   the wind turbine further comprising an auxiliary connector positioned and configured to connect the annular sections made of concrete to each other, the auxiliary connector being adapted to withstand assembly loads and loads induced by wind on the wind turbine in absence of the rotor, but not loads induced by the rotor.

2. The wind turbine of claim 1, wherein the annular sections made of concrete comprise:
   bars that emanate at least from a lower base of each of the annular sections, and
   housings located in an upper base of each of the annular sections, so that each bar is insertable into a respective housing of a lower annular section, each bar and each housing defining a bar-housing assembly.

3. The wind turbine of claim 2, wherein the auxiliary connector comprises resin in gaps existing between bars and housings in some of the bar-housing assemblies.

4. The wind turbine of claim 2, wherein the auxiliary connector comprises:
   a recess located in the annular sections, the recess being open towards an interior of the annular section located at the lower part of some of the housings, and
   a retaining element located on the bar in the recess area.

5. The wind turbine of claim 2, wherein the auxiliary connector comprises:
   first lugs which are integral with the upper base of the annular sections made of concrete,
   second lugs which are integral with the lower base of the annular sections, and
   dowel rods blocked between the first and second lugs of adjacent annular sections.

6. The wind turbine of claim 1, further comprising tensioning cables having an upper end and a lower end,
   wherein the upper end is connected to the tower and the lower end is connected so that the tensioning cables are tensioned in such way so as to provoke compression stress on the tower.

* * * * *